Nov. 13, 1956  R. M. SOMERS  2,770,680
SIGNALING SYSTEMS FOR DICTATING MACHINES
Filed July 29, 1952  3 Sheets-Sheet 1

INVENTOR.
Richard M. Somers
BY
Henry Lanahan
Attorney

Nov. 13, 1956  R. M. SOMERS  2,770,680
SIGNALING SYSTEMS FOR DICTATING MACHINES
Filed July 29, 1952  3 Sheets-Sheet 2
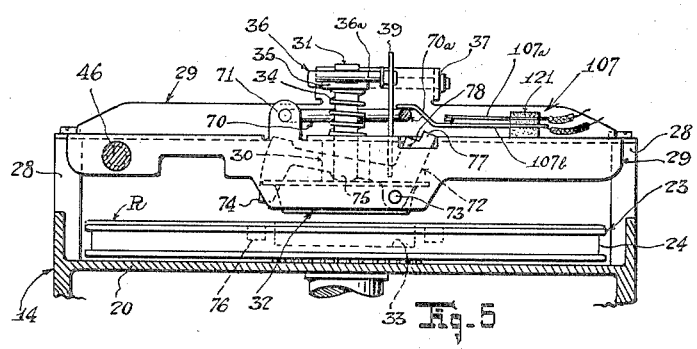
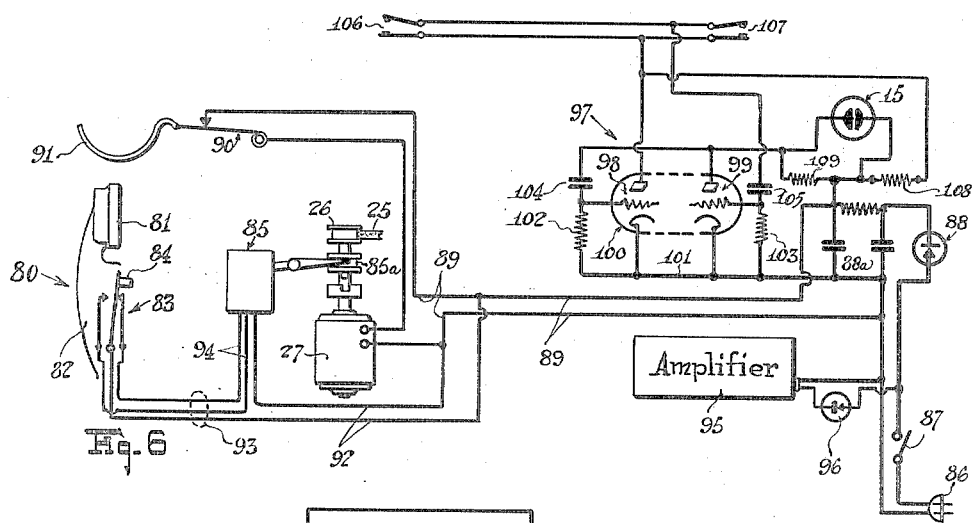
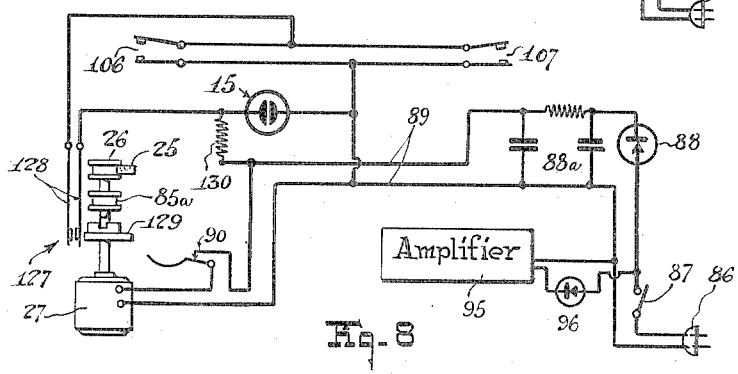
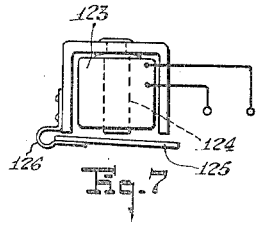
INVENTOR.
Richard M. Somers
BY Henry Lanahan
Attorney

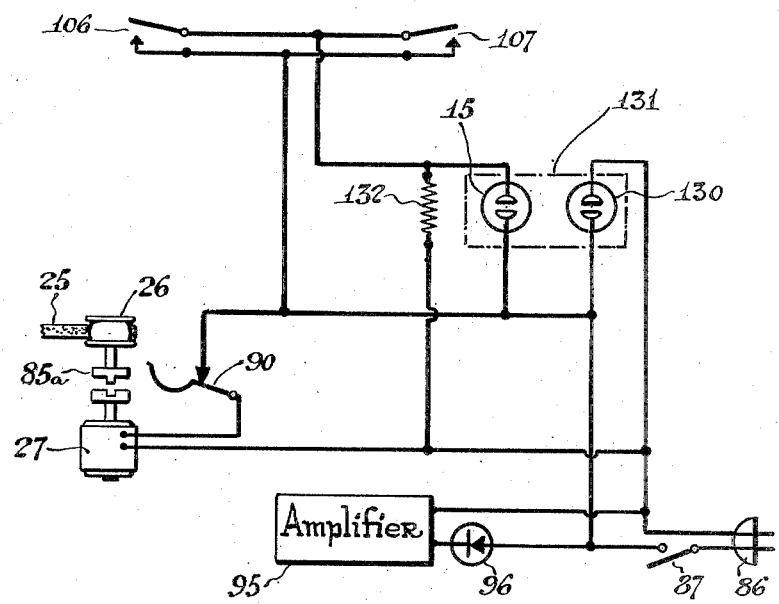

United States Patent Office 2,770,680
Patented Nov. 13, 1956

2,770,680

SIGNALING SYSTEMS FOR DICTATING MACHINES

Richard M. Somers, West Orange, N. J., assignor to Thomas A. Edison, Incorporated, West Orange, N. J., a corporation of New Jersey Application July 29, 1952, Serial No. 301,437

16 Claims. (Cl. 179—100.1)

This is a continuation-in-part of my pending application Serial No. 35,885, filed June 29, 1948, and being abandoned on the filing of this application.

This invention relates to signaling systems for dictating machines, and more particularly to novel and improved such systems which are adapted to positively warn the operator as to the operable condition of the machine before the machine is put into operation. This is accomplished by producing positive warnings of distinguishable character according to whether the machine is in or out of recording condition. In one embodiment a singular-type signaling means is controlled to produce positive warnings of distinguishable character according to whether the machine is in or out of recording condition and in another embodiment a unitary signaling means, but of a dual type, is so controlled to indicate positively when the machine is in and out of condition for recording. In each case, however, the warning is controlled independently of the start-stop control of the machine so that the operator can discern positively whether the machine is conditioned for recording or not before record rotation is started; and also, in each case, the warning is fully indicative as to whether the audio system is in recording condition or not and as to whether a record is properly mounted on the machine.

The usual dictating machine is provided with a handpiece, comprising a microphone and a start-stop control, which the operator holds in his hand as he dictates. This handpiece has a flexible connection with the machine to allow the operator to have a freedom of movement during the recordation of his dictation. In some of these machines a signal light has been mounted on the handpiece where it will be seen unavoidably by the operator during the use of the machine; typically, this signal light is controlled so that it will give a steady signal when the machine is put in operation—i. e., when record rotation is started—while the same is conditioned for recording, but will give a flashing light upon the machine being put into operation while it is in any other condition. Although this signaling system has the desirable feature of providing positive signals both when the machine is in and out of condition for recording, it has not proved to be wholly effective as a warning means to the operator when the machine is out of recording condition since the operator has to start the operation of the machine before a warning signal is given. Moreover, there are the disadvantages in this system that when the signal light is placed on the handpiece both the handpiece and its coupling with the machine are necessarily more bulky; additionally, when the signal light is on the handpiece it is to some an annoyance because of its being directly before the eyes of the operator as he dictates. However, it has been found in the field that the signaling light of systems of this character should not be placed on the machine proper, instead of on the handpiece, because operators will oftentimes pick up the handpiece and turn their backs to the machine before pressing the start-stop control to begin dictation, with the result that the op- erator never sees the signal light to be warned if he had inadvertently failed to condition the machine for recording.

In other prior-art signaling systems an effort has been made to overcome some of the objections just noted above by providing a sound signal which is operative prior to starting record rotation provided the record-reproduce lever is out of record position. In this system the sound signal is cut off when either the machine is put in operation or the record-reproduce lever is moved to record position. This signaling system has proven unsatisfactory because it endeavors first to indicate in a negative way— i. e., by the absence of a signal—when the machine is in condition for recording; yet an absence of signal had no definite meaning because the signal was cut off not only when the record-reproduce lever was in record position but also when the machine was in operation even though the record-reproduce lever was in reproduce or neutral position. In other words, in order for the operator to correctly interpret the significance of an absence of signal he had to be conscious of whether or not he had moved the start-stop control to start position.

The present signaling systems are adapted to overcome the abovementioned objections present in the prior signaling systems by providing a signaling system which is independent of whether or not the machine is in operation to indicate positively both when the machine is in and out of condition for recording. Preferably, a condition for recording is indicated by a steady light mounted on the machine proper; and other conditions may be indicated by flashing this light or by extinguishing the light, but this light signal may be replaced or be augmented by appropriate sound signals as will be apparent. However, in any case, this system is arranged so that the signaling is independent of the start-stop control. In so arranging the signaling system the operator is unavoidably warned as he faces the machine, to mount a record and/or pick up the handpiece, as to whether or not the machine is in condition for recording.

General objects of my invention are to provide improved signaling systems for dictating machines which are adapted to give the operator positive warning as to whether the machine is in or out of condition for recording and which are arranged so as not to encumber the use of the machine or to inconvenience the operator.

These and other objects and features of my invention will be apparent from the following description and the appended claims.

In the description of my invention reference is had to the accompanying drawings, of which:

Figure 5 is a fractional vertical section taken substantially on the line 5—5 of Figure 2;

Figure 6 is a diagrammatic view of circuits and mechanism illustrating particularly one embodiment of a signaling system according to my invention;

Figure 7 is a view of a sound device that may be incorporated in the signaling system of Figure 6;

Figure 8 is a diagrammatic view of circuits and mechanism illustrating a second embodiment of a signaling system according to my invention; and Figure 9 is a diagrammatic view of circuits and mechanism illustrating another embodiment of signaling system according to my invention.

Figure 1:
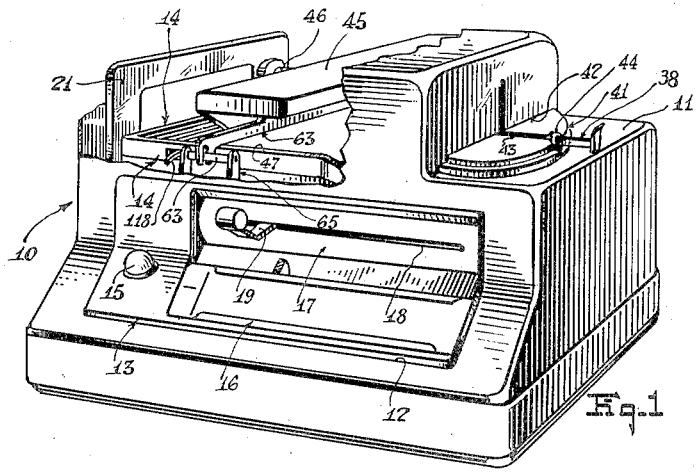
Figure 1 is a perspective view, with parts broken away, of a dictating machine in which my invention is incorporated.

Only by way of illustration, the signalling systems of my invention are herein described in connection with a dictating machine of the type shown in the accompanying drawings.

Since the present invention is not concerned with details of the machine per se, the machine may be herein somewhat briefly described particularly since details thereof are fully described in the following patents: Patent No. 2,533,359 of the present inventor and Charles W. Dann issued December 12, 1950, entitled Dictating Machine and describing the complete operating mechanism thereof less details of the record closure and record clamping mechanism; Patent No. 2,524,561 of Charles W. Dann issued October 3, 1950, entitled Phonograph and describing the record clamping mechanism; and Patent No. 2,538,392 of the present inventor issued January 16, 1951, entitled Closure for Phonograph and describing the record closure.

The present dictating machine has a generally rectangular housing 10 with a rightwardly-extending platform 11, to provide access for mounting a record on and removing it from the machine, and with a generally rectangular opening 12 in its front wall through which projects slightly a section 13 of a main frame 14 of the machine. On the lower portion of this frame section there is a signal light 15 and a holder 16 for an index slip (not shown). Above the index-slip holder there is an inset laterally-extending closure 17 which is pivoted on a transverse horizontal shaft 17a that is mounted at its ends in standards 14a and 14b of the main frame; this closure is arcuate in cross section and has a horizontal slot 18 through which projects a record-reproduce lever 19 for placing the machine selectively in record, neutral and reproduce conditions. The engagement of the lever 19 with the slot 18 forms a spline connection of the lever with the closure so that the latter is turned in unison with the former.

The main frame comprises a horizontal top plate 20 (Figures 2 and 3) carried by upstanding channeled members 21 and 22 at its left and right sides. Journalled to this top plate is a turntable 23 having a grooved periphery 24 for receiving a belt 25 driven by a pulley 26 of a motor 27.

On standards 28 of the top plate there is a channeled frame 29 diametrically overlying the turntable. At the center of this frame there is a bearing 30 (Figure 5) which receives slidably a vertical shaft 31. On the lower end of this shaft there is a clamping member 32 of a frusto-conical shape which, as the shaft is depressed, passes partially through a central hole of a record R on the turntable and enters a central well 33 of the turntable to clamp the record in place. This record-clamping member is urged upwardly by a compression spring 34 between the frame 29 and a washer 35 on the shaft 31. The washer 35 is retained to the shaft by engagement of one leg 36a of a U-shaped lever 36 (Figure 2) with a slot in the shaft. The other leg 36b of this lever is pivoted at 37 to a top portion of the frame 29. Pivoted to the under portion of this frame on an axis parallel to the leg 36b is a handle 38 having a vertical cam plate 39 at its hub. This cam plate extends upwardly through an opening 40 of the frame 29 and receives an end portion of the leg 36a. The cam plate is arranged so that when the handle 38 is depressed the clamping member 32 is moved downwardly to clamp a record R to the turntable and to detent the handle in its operated position. When the handle is released the clamping member 32 is raised by the spring 34 to permit removal of the record from the turntable.

As shown in Figure 1, about one-half of the turntable is unenclosed by the housing 10. However, a cover 41 is provided for this unenclosed portion so that the mounted record will be substantially wholly enclosed during operation of the machine. This cover is controlled by a handle 38 so that the record R will be made accessible as the handle is raised. The cover 41 is pivoted at its adjacent edge 42 with the housing 10 and, although it is divided into two sections to provide a clearance slot 43 for the handle, a strap 44 interconnects these sections and overlies the handle so that the cover is raised when the handle is released.

At the left of the frame 29 there is a carriage 45 which is slidably mounted on a transverse rod 46 at its rearward end and which rests slidably on a guide rail 47 of the top plate 20 at its forward end. This carriage is coupled by a link 48 to the uppermost arm of a U-lever 49 which is pivoted at 50 to the back portion of the top plate. The lower arm of this lever is coupled by a link 51 (fractionally shown) to a second carriage not herein necessary to show. Suffice it to say that this second carriage carries the record-reproduce lever 19 and is coupled, when this lever 19 is in record and reproduce positions, to a feed screw 52 journalled to the main frame on a horizontal transverse axis and coupled by a gearing 53 to the turntable. Thus, when the turntable is driven by the motor 27 with the record-reproduce lever 19 in either record or reproduce position, this second carriage is driven along the feed screw to drive progressively the carriage 45 laterally across the left portion of the turntable.

Below the rearward half of the carriage 45 there is a recorder 54 which is pivoted at its rearward end on a horizontal axis to the carriage as on a pair of cone pivots 55. This recorder has a depending recorder stylus 56 at its forward end. In front of the recorder there is a reproducer 57 which has a universal pivotal connection 58 at its forward end to the carriage 45 and a reproducer stylus 59 at its rearward end. The recorder and the reproducer have respectively lift arms 60 extending leftwardly therefrom which overlie a slide 61 having pin and slot connections 62 to the left wall of the carriage. This slide has a downwardly-extending fork 63 at its forward end which engages a cross rod 64 carried by a bail 65 mounted on the pivoted closure 17. The rearward portion of this slide has a raised cam 66 provided with a long central dwell 67. When the record-reproduce lever 19 is in a neutral position intermediate its record and reproduce positions, both lift arms 60 rest on the dwell 67 and hold the recorder and reproducer at a clearance distance above the record R. When the record-reproduce lever 19 is moved downwardly into a record position, the slide is moved forwardly to move the cam 66 free of the lift arm of the recorder and thus allow the recorder to engage the record as in response to its weight; reversely, when the record-reproduce lever 19 is moved upwardly into a reproduce position, the cam 66 is moved free of the lift arm of the reproducer to allow this unit to engage the record.

As is described in the aforementioned Dann Patent No. 2,524,561, neither the recorder nor reproducer is however allowed to be lowered into an operative position in relation to a mounted record as the record-reproduce lever 19 is moved into record and reproduce positions unless the record R is mounted on and clamped to the turntable. The means which perform this restrictive action comprise additional lift arms 68 and 69 on the recorder and reproducer respectively and a U-shaped lift lever 70 which has a leftwardly-extending leg 70a underlying these lift arms 68 and 69. The lever 70 has its second leg 70b pivoted at 71 to the frame 29. The cross member of the lever 70 overlies the cross member of the U-lever 36 to control the lever 70 so that it will be held raised whenever the record-clamping mechanism is released but will permit the lever 70 to be lowered into an ineffective position when this clamping mechanism is actuated. In the raised position of the lever 70 the same withholds both the recorder and the reproducer from being lowered into a position for engagement with a mounted record.

Additionally, the lever 70 is controlled by a detent lever 72 which is controlled both as to whether or not the record clamp is actuated and whether or not a record is mounted on the turntable. This detent lever extends from front to back (Figure 5) and is pivoted at its forward end, as at 73, to the frame 29. At its rearward end the lever has a depending record-detecting finger 74. When the clamping mechanism is released, a central portion 75 of the detent lever rests on the clamping member 32 and holds the detecting finger 74 thereof at a clearance distance above the turntable. If the record-clamping mechanism is actuated without there being a record on the turntable, this detent lever is lowered in unison with the clamping member 32, with the detecting finger thereof entering an annular groove 76 in the turntable to cause an upstanding detent arm 77 of the detent lever to move below the leg 70a of the U-lever 70 and detent it from being lowered into an ineffective position. However, if a record R is on the turntable as the clamping mechanism is actuated, the detecting finger 74 will contact the record and stop the detent lever in an intermediate position thereof. In this intermediate position of the detent lever a notch 78 provided in the arm 77 thereof is aligned with the leg 70a to allow the lever 70 to move to a fully downward or ineffective position as the record-clamping mechanism is actuated. In the final downward movement of the lever 70 it engages a side edge of the notch 78 and cams the detent lever upwardly so as to remove it from contact with the mounted record. Thus, the lever 70 is lowered into an ineffective position as the record-clamping mechanism is actuated while a record is on the turntable but is withheld in an effective position should the clamping mechanism be actuated without a record being on the turntable.

The handpiece for the present dictating machine is fractionally shown in Figure 6 and referred to as 80. This handpiece comprises a transducer unit 81 usable either as a microphone or as a receiver. The handpiece has a handle portion 82 in which there is mounted a single-pole double-throw start-stop switch 83. This switch is biased into the position shown and is operable by a push button 84 fractionally shown. This start-stop switch is employed to control an actuator 85 for a clutch 85a provided between the motor 27 and its drive pulley 26.

Power for the motor and actuator 85 is obtained from an A. C. or D. C. line as by way of a plug 86 and master switch 87. Preferably, although not necessarily, the actuator and motor are operated from direct current, in which case the power supply is led through a rectifier 88 and resistance-capacity filter 88a. The motor is connected to the output of this filter by a circuit 89 serially including a motor switch 90 the pole member of which has a hook extension 91, typically mounted on a suitable portion of the main frame or housing of the machine, which serves as the support for the handpiece 80 when the machine is not in use. This pole member is biased upwardly normally to hold the motor switch closed but is adapted to yield to the weight of the handpiece, when the handpiece is placed thereon, to open the motor switch. Another circuit 92 leading from the filter 88a serves to supply power to the actuator 85. One lead of this circuit connects directly to the actuator and the other runs by way of a cable 93 to the pole of the start-stop switch 83. The cable 93, which is a flexible one connecting the handpiece to the machine, includes two other leads 94 leading from the contacts of the switch 83 to the actuator 85.

The actuator 85 may be of a well-known construction disclosed in the Langley Patent No. 1,380,486 issued June 7, 1921, and entitled Controlling Devices. This actuator need not be herein described other than that it serves to hold the clutch 85a disengaged when the start-stop switch 83 is in its released or "stop" position and serves to engage the clutch when the switch 83 is moved by the button 84 into an actuated or "start" position.

The present dictating machine may include an electrical amplifier 95 connected by way of a rectifier 96 and the master switch 87 to the plug 86. The audio circuit of this machine need not be herein shown as it is well understood in the dictating machine art. Suffice it to say that when the record-reproduce lever 19 is in record position the transducer unit 81, acting as a microphone, is connected to the input of the amplifier and the recorder 54 is connected to its output, and that when the lever 19 is in reproduce position this unit 81, now acting as a receiver, is connected to the output of the amplifier and the reproducer 57 is connected to its input.

The aforementioned signal light 15 of the signaling system of the present invention may typically be of a neon type. It may be operated from direct-current power obtained as by way of the rectifier 88 and filter 88a (Figure 6). In my first embodiment this light 15 is controlled so that it is flashed whenever the dictating machine is in other than an operable condition for recording. In the embodiment shown in Figure 6, the flashing is performed by a relaxation-type oscillator 97 comprising two triodes 98 and 99 enclosed for instance in a single envelope 100. The cathodes of these triodes are connected to a ground lead 101 of the rectifier-filter 88—88a, and the grids of these triodes are connected by respective resistors 102 and 103 to this ground lead. Also the grid of the triode 98 is connected through a condenser 104 to the plate of the triode 99. Connected to the grid of the triode 99 is a condenser 105. This condenser is to be connected to the plate of the triode 98 whenever the oscillator is to be put in operation, the connection being by either one of two parallel-connected switches 106 and 107. The plate of the triode 98 is connected through a resistor 108 to the positive side of the filter 88a and the plate of the triode 99 is connected through a resistor 109 and the lamp 15, the two being connected in parallel, to the same positive side of the filter.

As shown, the amplifier 95 is adapted to work either from an A. C. or a D. C. source but the plug 86 will of course have to be properly poled to render the rectifier 96 conductive when the source is a direct current one. The rectifier 88 is poled in the same direction so that it will pass current only when the rectifier 96 is conductive to render the amplifier operative. If the plug 86 is properly poled and both of the switches 106 and 107 are opened, the oscillator 97 is inactive but D. C. current will be supplied to the lamp 15 by way of the triode 99 to cause the lamp to give a steady signal and D. C. current is supplied to the amplifier to render it operative. Among other functions, the lamp 15 serves to indicate when the amplifier is operative. Thus, in practice, if upon connecting the plug 86 to a source of direct current and closing the master switch 87 the lamp does not light at the expiration of the heating-up period of the rectifier 88, the operator will know that the plug is connected with wrong polarity to the D. C. source. Also, even if the plug is connected with right polarity to a D. C. source, or is connected to an A. C. source, the lamp will not light until the amplifier becomes operative since the heating-up period of the rectifier 88 is substantially the same as the heating-up time for the amplifier.

If either of the switches 106 or 107 is closed while the lamp 15 is lit, the oscillator is set in operation to cause the voltage of the plates of the triodes to vary at a frequency depending upon the time constant of the oscillator circuit. The plate voltage variation of the triode 99 causes the lamp 15 to flash. In the present system the switches 106 and 107 are controlled according to whether or not the machine is in a condition for recording but not according to whether or not the machine is in operation.

Figure 2:
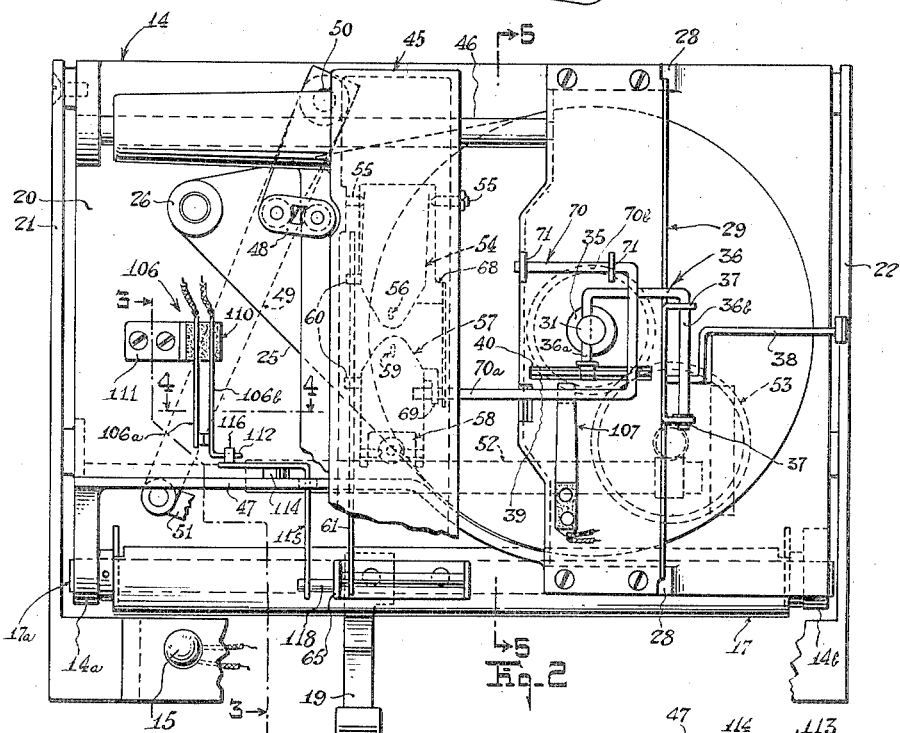
Figure 2 is a fractional top plan view of this machine as seen with the housing removed.
Figures 3, 4:
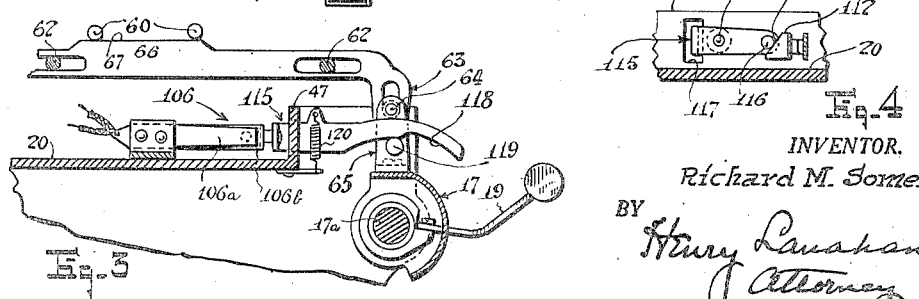
Figure 3 is a fractional section taken substantially on the line 3—3 of Figure 2.
Figure 4 is a fractional section taken substantially on the line 4—4 of Figure 2.

A proper conditioning of the machine for recording requires firstly that the audio system thereof be put in recording condition. Accordingly, the switch 106 of the signaling system is controlled by the record-reproduce lever 19. As shown in Figures 2, 3 and 4, this switch may comprise two blades 106a and 106b mounted insulatedly in a stack 110 which is held by a bracket 111 to the top plate 20. One blade 106b has a turned-over lug 112 at its free end which is provided with an inclined edge 113. Pivoted at 114 to the guide 47 is a right-angle lever 115 having one leg carrying a pin 116 for engaging this inclined edge and causing the switch to be held closed when the lever is urged counterclockwise as viewed from the front of the machine. The other leg of this lever extends forwardly through a clearance opening 117 in the guide rail 47 and has a cam face 118 on its lower edge. This cam face slidably engages a pin 119, mounted on the bail 65, under influence of a tension spring 120 which urges the lever 115 clockwise about its pivot axis. When the lever 19 is either in a neutral position (the position it occupies in Figure 3) or in an upper reproducing position, the pin 119 engages a portion of the cam face 118 which is arcuate about the pivot shaft 17a to press the pin 116 against the edge 113 and hold the switch 106 closed. However, the forward portion of the cam face 118 is offset upwardly (Figure 3) so that when the lever 19 is moved downwardly into record position the lever 115 will be free to move clockwise under influence of the spring 120 and allow the switch 106 to open in response to a natural bias of the switch blade 106b. Thus, assuming the switch 107 to be open, the switch 106 is closed to cause the lamp 15 to flash whenever the audio system is in reproducing and neutral positions and is opened to cause the lamp to give a steady signal whenever the audio system is in condition for recording.

A proper conditioning of the dictating machine for operation further requires that a record be mounted on and secured to the turntable. In dictating machines using disk records of plastic material it is highly important that the records be fully enclosed during operation of the machine since these records tend easily to become statically charged and to attract dust and dirt particles thereto which cause a marked increase in surface noise when the recordations thereon are reproduced. For this reason there is provided the cover 41 hereinbefore described. When the record support or turntable is not open to view, it is particularly important that the operator be warned when a record has not been installed in the machine; even when a mounted record is in view it is still important that the operator be warned if the record is not properly secured to its support. In the present invention, the operator is so warned as to both of these conditions by causing the switch 107 to be controlled in accordance with the positioning of the lift lever 70. By way of illustration, as shown in Figures 2 and 5, this switch comprises two blades 107a and 107b mounted in a stack 121 that is secured to the frame 29. The lower switch blade is extended to overlie the lever 70 so that the switch is held closed when the lever is in a raised position and is opened in response to a bias of the lower blade as the lever 70 is lowered. As has been hereinbefore described, the lever 70 is in its raised position both when the record-clamping mechanism is unactuated and when it is actuated without there being a record on the turntable, and is in a lowered position only when a record is mounted on and clamped to the turntable. Thus the switch 107 is held closed to cause the lamp 15 to flash if a record is not properly mounted on the machine.

Even though the cable 93 may be long to permit a wide latitude of movement of the operator during use of the machine, he will necessarily have to face the machine when he mounts a record thereon and when he picks up the handpiece 80. The present signaling system is arranged so that it is necessarily operative when these acts are performed, regardless of whether the start-stop control 83 is then operated or not. As a result, the operator will receive a positive signal in the form of a steady or flashing light depending on whether the machine is in or out of condition for recording.

If it is desired to augment the present light signaling with a sound signal the resistor 108 may be replaced by any suitable sound-signaling device. For instance such device may be a buzzer to give a steady buzzing sound when the machine is in condition for recording and an interrupted buzzing sound when it is out of condition for recording. Preferably, the resistor 108 is replaced by an electromagnet 123 having a central iron core 124 and a cooperating movable armature 125 held normally spaced therefrom by a spring 126. When both switches 106 and 107 are open—which they will be when the machine is in a condition for recording—the armature is held stationary and no sound is produced. However, when either of these switches is closed—which they will be when the machine is not in a condition for recording—the armature will be snapped against the core at the frequency of the oscillations of the oscillator 97 to produce a metallic clicking sound to augment the flashing signal of the lamp 15.

In Figure 8 the electronic oscillator 97 for flashing the lamp 15 is replaced by a mechanical flasher 127 driven by the motor 27. This flasher comprises a pair of switch members 128 biased open and arranged to be intermittently closed by a cam 129 on the shaft of the motor when the motor is running. The switch 128 is connected across the lamp 15 by way of the signalling control switches 106 and 107 which, as in the first embodiment, are connected in parallel with each other. The lamp 15 is connected through a resistor 130 to a rectified power supply. Also, the motor 27 is connected to this rectified power supply by way of the motor switch 90 aforedescribed.

It will be observed that in this second embodiment the lamp 15 is lit whenever the rectifier 88 is conductive. If at the same time the motor 27 is running—which it will be if the handpiece 80 is removed from its support—and either or both of the switches 106 and 107 are closed—which they will be if either the record-reproducer lever is out of record position or the turntable is free of a properly mounted record—the switch 128 will intermittently short the lamp to cause the lamp to give a flashing signal. (The resistor 130 is placed in the power supply circuit of the lamp so that when the lamp is shorted there will not be an excessive current drain on the rectified power supply.) On the other hand, if both of the switches 106 and 107 are open—which they will be when the record-reproduce lever 19 is in record position and a record is mounted on and clamped to the turntable—the circuit of the flasher 127 is open and the lamp 15 will then give a steady signal. Thus there is obtained a signaling action which is independent of the start-stop control, the same as is the case in the foregoing embodiment. In this latter embodiment the motor must be running before a flashing signal can be produced; however, since the operator will be necessarily facing the machine when he picks up the handpiece from its support he will at that instant necessarily observe the light and be warned if the machine is not in a condition for recording.

In Figure 9 there is shown a simplified signaling system according to my invention wherein the signaling lamp 15 gives a steady light independently of the start stop control 83 whenever the machine is in a fully operative condition for recording, the same as in my previous embodiments, but wherein this lamp is extinguished whenever the machine is in reproducing or neutral condition. As before, the master switch 87 controls power to the amplifier 95 and the availability of power to the motor 27 through the switch 90. A signal lamp 130 is connected to the power supply via the master switch to light when the master switch is closed. Preferably, the signaling lamps 15 and 130 are positioned in physical proximity with each other to constitute a unitary signaling device 131 for the machine. The signal lamp 15 is connected also to the power supply through a resistor 132 and the master switch 87, but connected in parallel with the signal lamp are the signaling control switches 106 and 107. The rectifier 88 and accompanying filter 88a are not shown since operation of the motor and signaling lamps from a rectified power supply is not necessary.

Since the switch 106 is open while the audio system is in recording condition and since the switch 107 is open when a record is properly mounted on the machine, the signal lamp 15 is rendered effective to give a steady light whenever the machine is in a fully operative condition for recording, it being of course understood that the master switch must first be closed, which condition will be indicated by lighting of the signal lamp 130. On the other hand, if either the audio system is placed out of recording condition or a record is not properly mounted on the machine, either the switch 106 or 107 will be closed to short out the lamp 15 and extinguish its light wherefore to indicate that the machine is not in a condition for recording. Moreover, since the switch 107 is controlled by the closure 41 as when a record is on the turntable, the signal lamp 15 will give a steady light only when the audio system is in recording condition, a record is on the turntable and the closure 41 is closed. Thus, the lamp 15 gives a positive indication when the machine is in condition for recording; also, as before, this positive indication is given independently of whether or not the start-stop control 83 is operated.

From another viewpoint, upon considering both lamps 15 and 130 as a unitary signaling device for the machine, as aforementioned, only the lamp 130 is lit when the switch is out of condition for recording and both lamps are lit with steady lights when the machine is in condition for recording. From this viewpoint, this embodiment, like the foregoing, provides positive signaling of distinguishable character before record rotation is started indicating when the machine is in and out of condition for recording. Thus, as before, as soon as the master switch 87 is closed and before the record rotation is started, the operator is informed positively as to whether the machine is properly conditioned for the recordation of dictation.

The embodiments of my invention herein particularly shown and described are intended to be illustrative and not necessarily limitative of my invention since the same are subject to changes and modifications without departure from the scope of my invention which I endeavor to express according to the following claims. In interpreting these claims it is to be noted that the term "conditioning means" is employed to cover any or all means controlling the condition of the machine exclusive of the start-stop means for putting the machine into and out of operation.

I claim:

1. In a dictating machine including a start-stop control: the combination of means for selectively placing said machine into recording and other conditions; a signaling system independent of said start-stop control including means for giving signals of different character; and means controlled solely by said conditioning means for causing said signaling means to give a signal of one character when the machine is in condition for recording and to give a signal of a different character when the machine is out of condition for recording, irrespective of whether the machine is in or out of operation.

2. In a dictating machine including a rotatable record support, a drive motor for rotating said support and a start-stop control for said support: the combination of a master switch for said machine; a switch for said motor; a current-supply circuit serially including said switches to require both to be in their "on" positions in order to supply current to said motor; a signaling device; an energizing circuit for said signaling device connected to said supply circuit between said switches for positively supplying operating current to said signaling device when said master switch is in "on" position; means selectively operable to place said machine in different operable conditions; and means in said energizing circuit operatively independent of said start-stop control and controlled by said conditioning means independently of whether or not said record support is in rotation for intermittently interrupting the signal of said signaling device.

3. In a dictating machine including a rotatable record support, a drive mechanism for rotating said support, a start-top control for said drive mechanism and a record-cooperable translating device adjustable into different conditions in relation to a supported record: the combination of operable conditioning means coupled to said translating device and movable into different positions for respectively placing the translating device into recording and other conditions; a signaling device including means selectively controllable to give either a steady or an interrupted signal; and a means operatively independent of said start-stop control and controlled by said conditioning means for causing said signaling device to give an interrupted signal before record rotation is started whenever said machine is in other than a condition for recording and to give a steady signal before record rotation is started whenever said machine is in condition for recording.

4. In a dictating machine including a rotatable record support, a record-cooperable translating device adjustable into different conditions in relation to a supported record, a drive motor for said support and a start-stop control: the combination of an on-off master control for said machine; a signaling device; means connecting said signaling device to said master control whereby the signaling device is placed into and out of operation as said master control is placed in "on" and "off" positions respectively; means operatively independent of said start-stop control for intermittently interrupting the signal of said signaling device; means for differently conditioning said translating device; and means coupled to said conditioning means for concurrently placing said interrupting means into and out of operation as said translating device is placed into different respective conditions.

5. The combination set forth in claim 4 including a conditioning control for said machine independent of said translating device control; and means operatively interconnecting said conditioning controls with said interrupting means for rendering the controls respectively effective to put said interrupting means in operation.

6. In a dictating machine including a rotatable record support: the combination of means for releasably securing a record to said support; a signaling device; means for changing the character of the signal of said device; and means operatively coupled to said securing means for operating said changing means according to whether or not a record is secured to said support.

7. In a dictating machine including an electrical amplifier: the combination of a master on-off control for said machine and amplifier; a signaling system comprising a single signaling device; a circuit, including said master control and said signaling device and closed by said master switch when the same is moved to "on" position to connect the machine to a source of electric current, for supplying current to said signaling system; time-delay means separate from said amplifier for delaying said signaling device from giving a signal after said master switch is moved to "on" position until the expiration of a time interval of the order of the heating-up time of said amplifier; and means, included in said signaling system and coupled to said machine for operation according to the conditioning thereof, for changing the character of the signal produced by the signaling device.

8. In a dictating machine including a housing and an operating mechanism in said housing including a record support: the combination of a control member on said mechanism movable to place the mechanism into and out of operating condition; an openable closure on said housing operatively coupled to said control member so that the closure is adapted to be in closed position when said mechanism is in said operating condition; a signaling means; means selectively controllable to cause said signaling means to produce signals of different character; and means associated with said record support and operatively connecting said last-stated means to said closure only when a record is on said support for causing the character of the signals produced by said signaling means to be controlled according to whether said closure is open or closed.

9. In a dictating machine including a rotatable record support and a drive mechanism for said support including a start-stop control: the combination of releasable means cooperable with said support to secure a record thereon; a record-cooperable translating device; conditioning means for placing said translating device into record and other conditions in relation to a supported record; a signaling device; a current supply circuit connected to said signaling device and including a master on-off switch for said machine operable to render the signaling device operative; means in said current supply circuit and operatively independent of said drive mechanism for interrupting the signal of said signaling device; operable switch means connected to said interrupting means for disabling the same; control means associated with said support and coupled to said securing means for operation by the latter only when a record is mounted on said support; and operating means for said switch means, jointly controlled by said control means and by said conditioning means, for causing said interrupting means to be disabled only when said translating device is in record condition and the record is simultaneously secured to said support.

10. In a dictating machine including a rotatable record support and a drive mechanism for said support including a start-stop control: the combination of releasable means cooperable with said support to secure a record thereon; a record-cooperable translating device; conditioning means for placing said translating device into record and other conditions in relation to a supported record; a signaling means; a current supply circuit connected to said signaling means and including a master on-off switch for said machine operable to render the signaling means operative; electrically operable means associated with said signaling means and operatively independent of said drive mechanism for changing the character of the signals produced by said signaling means; a control device operatively associated with said support and with said record securing means for operation by the latter only in response to actuation of said securing means while a record is on said support; and switch means included in said electrically operable signal changing means and controlled jointly by said conditioning means and by said control device for causing said signaling means to produce a signal of one character when said machine is out of condition for recording and of another character only when said translating device is in record condition and the record is simultaneously secured to said support.

11. In a dictating machine including a rotatable record support and a drive mechanism for said support including a start-stop control: the combination of releasable means cooperable with said support to secure a record thereon; a record-cooperable translating device; conditioning means for placing said translating device into record and other conditions in relation to a supported record; a signaling means; a current supply circuit connected to said signaling means and including a master on-off switch for said machine operable to render the signaling means operative; means associated with said signaling means and operatively independent of said drive mechanism for changing the character of the signals produced by said means; and means, coupled to said signal changing means and controlled jointly by said conditioning means and by said securing means only when a record is mounted on said support, for causing said signaling means to produce a signal of one character when said machine is out of condition for recording and of another character only when said translating device is in record condition and the record is simultaneously secured to said support.

12. In a dictating machine including a rotatable record support, a drive motor, a control operable selectively to start rotation of said support by said motor and to stop said rotation, and translating means placeable into recording and other conditions in relation to a supported record: the combination of means connected to said translating means for selectively placing the latter into recording and other conditions; a signaling device; an energizable circuit for said signaling device; an interrupter in said circuit operatively independent of said start-stop control; and means coupled to said conditioning means and operatively connected to said interrupter for causing said signaling device to give a steady signal when said translating means is in recording condition and to give an interrupted signal when said translating means is out of recording condition.

13. In a dictating machine including a start-stop control: the combination of means for selectively placing said machine into recording, reproducing and other conditions; a signaling system independent of said start-stop control including a signaling device operable to give a steady signal; and means controlled solely by said conditioning means for causing said signaling device to give a steady signal only when the machine is in condition for recording, irrespective of whether the machine is in or out of operation, and to be shut off when the machine is in condition for reproducing.

14. In a dictating machine including a rotatable record support, a drive motor for rotating said support, and a start-stop control for said support: the combination of a current supply circuit including a master switch for controlling electric power to said machine; a signaling device for said machine; an energizing circuit for said signaling device connected to said current supply circuit via said master switch; means selectively operable to place said machine in recording and other conditions; and means in said energizing circuit operatively independent of said start-stop control and controlled by said conditioning means independently of whether or not said record support is in rotation for causing said signaling devices to give a steady signal only when said machine is in condition for recording.

15. In a dictating machine including operating mechanism comprising a rotatable record support, translating means adjustable into recording and other conditions in relation to a record on said support, and means for rotating said support: the combination of a housing for said operating mechanism including a closure mounted for opening movement to render accessible a supported record for manual removal from said support; means for adjusting said translating means; control means; record-detecting means operatively associated with said record support and means coupling the control means to said closure for causing the control means to be operated only as the closure is moved to closed position while a record is on said support; a signaling device operable to give a steady signal; and means controlled jointly by said adjusting means and said control means, for causing said signaling device to give a steady signal only when said translating means is in recording condition and said closure is closed while a record is on said support.

16. In a dictating machine including a rotatable record support, a drive motor for rotating said support, a start-stop control for said support, and a record-cooperable translating means: the combination of means for adjusting said translating means into recording and other conditions in relation to a supported record; means for releasably securing a record to said support; a signaling device operable to give a steady signal; an energizing circuit for said signaling device operatively independent of said start-stop control; and switches in said signal-energizing circuit controlled respectively by said adjusting means and said record-securing means for causing said signaling device to give a steady signal before record rotation is started upon said translating means being in recording condition and a record being concurrently secured to said support and for causing said signaling device to be inoperative upon said translating means being out of recording condition, upon a record being not mounted on said support, or both.

References Cited in the file of this patent

UNITED STATES PATENTS

| | | |
|---|---|---|
| 2,277,207 | Chenoweth et al. | Mar. 24, 1924 |
| 2,375,525 | Clausen | May 8, 1945 |